May 28, 1935. G. H. GIBSON Re. 19,592

COMBUSTION REGULATION

Original Filed Aug. 21, 1924 3 Sheets-Sheet 1

INVENTOR
Geo H Gibson
BY
John E Hubbell
ATTORNEY

May 28, 1935. G. H. GIBSON Re. 19,592

COMBUSTION REGULATION

Original Filed Aug. 21, 1924 3 Sheets-Sheet 2

Fig. 2,

INVENTOR
Geo H Gibson
BY
John E Hubbell
ATTORNEY

May 28, 1935. G. H. GIBSON Re. 19,592

COMBUSTION REGULATION

Original Filed Aug. 21, 1924 3 Sheets-Sheet 3

INVENTOR

Geo. H. Gibson

BY

John E. Dubbell

ATTORNEY

Reissued May 28, 1935

Re. 19,592

UNITED STATES PATENT OFFICE 19,592

COMBUSTION REGULATION

George H. Gibson, Upper Montclair, N. J.

Original No. 1,583,398, dated May 4, 1926, Serial No. 733,289, August 21, 1924. Application for reissue October 28, 1933, Serial No. 695,703

9 Claims. (Cl. 236—14)

The general object of my present invention is to provide simple and effective provisions for varying the rate at which fuel is supplied to a boiler furnace in automatic response to the character of the gaseous products of combustion formed, so as to insure and maintain efficient combustion conditions.

My present invention is adapted for use in automatic combustion regulating systems having provisions for varying the speed of the fuel feeding mechanism and for varying the supply of air for combustion in automatic response to the boiler load, and was primarily devised to overcome the practical difficulty, which has been experienced in the operation of such systems in securing the proper rate of fuel feed at all times and under all conditions. In practice the rate of fuel feed is not always strictly proportional to the speed of the fuel feeding mechanism whether that mechanism is an ordinary mechanical stoker supplying solid fuel to a grate or is the fuel feeding mechanism of a powdered coal burning furnace. In the case of a furnace in which solid fuel is burned on a grate, failure to make the rate of fuel supply proportional to the rate of combustion results in an increase or decrease in the thickness of the fuel bed with a consequent tendency to increase and decrease the $CO_2$ content in the heating gases leaving the furnace. Even though the rate of fuel supply in such a furnace varies with the rate of combustion so that the desired average fuel bed thickness is maintained, clinker formations and "holes" in the fuel bed require the rate of fuel supplied to be varied from time to time to correspondingly thicken or thin the fuel bed in order to maintain a desirable $CO_2$ content in the heating gases.

In a preferred practical mode of utilizing the invention in connection with a combustion regulating system in which the stoker speed and the rate at which air for combustion is supplied are automatically varied in accordance with the boiler load, I add to the regulating system means such as an ordinary $CO_2$ machine for modifying the stoker speed as the $CO_2$ content in the flue gases decreases below or rises above a predetermined desirable value. In a modified arrangement especially adapted for use with powdered coal burning furnaces, I regulate the speed of the blower supplying the carrier air for moving the powdered coal into the combustion chamber in general response to the boiler load, but with a modifying action dependent upon the $CO_2$ content in the flue gases.

In accordance with the present invention, the general rate of combustion may be varied in inverse proportion to the steam pressure or in direct proportion with the rate of steam generation, or in joint response to these two factors, but in an especially desirable arrangement, the rate at which air to support combustion is supplied is made dependent on the boiler steam pressure, whereas the rate at which fuel is supplied is made primarily responsive to the rate at which steam is generated, and is modified in accordance with the $CO_2$ content in the flue gases.

The various features of novelty which characterize my invention are pointed out with particularity in the claims annexed to and forming a part of this specification. For a better understanding of the invention, however, and the advantages possessed by it, references should be had to the accompanying drawings and descriptive matter in which I have illustrated and described preferred embodiments of the invention.

Figure 1:
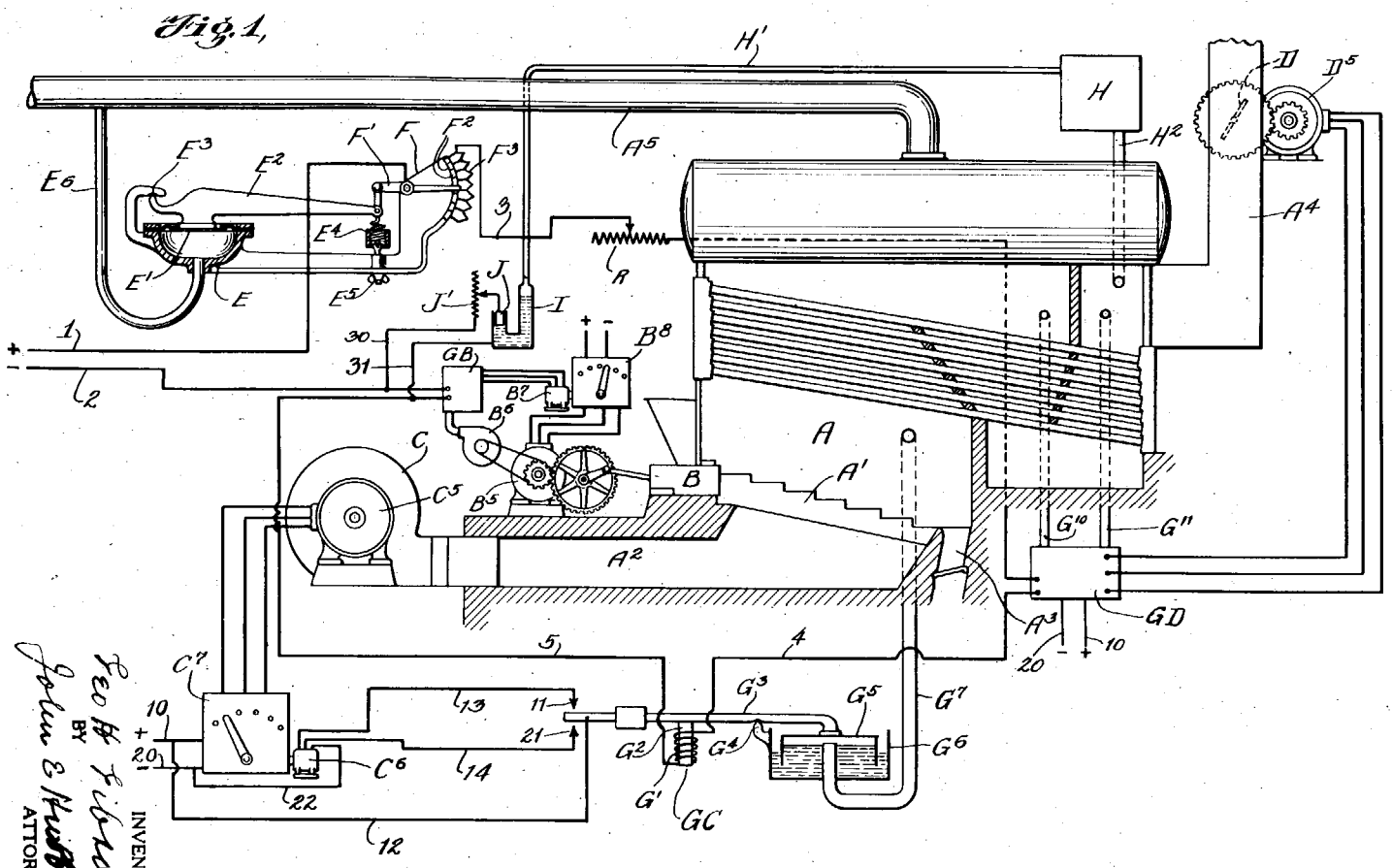
Fig. 1 is a diagrammatic elevation of a boiler furnace burning solid coal provided with a stoker.

In the embodiment of my invention, diagrammatically illustrated in Fig. 1, A represents the combustion chamber of a boiler furnace in which solid fuel is burned on a stoker grate A'. Fuel is supplied to the grate A' by a stoker mechanism B operated by a motor $B^5$. Air for combustion is supplied to the furnace through an inlet $A^2$ opening at the under side of the grate and supplied with air under suitable pressure by a blower C operated by a motor $C^5$. $A^3$ represents a discharge passage for ashes, $A^4$ is a smoke stack connection, and D a draft regulating damper therein. The damper D is adjusted by means of a motor $D^5$.

In accordance with the present invention, the combustion is controlled and regulated in response to the pressure of the steam and the composition of the flue gases in the manner now to be described. E represents a steam pressure gauge comprising a diaphragm E' subjected to the boiler steam pressure as by means of a branch $E^6$ from the boiler steam pipe $A^5$. The thrust of the steam pressure against the diaphragm E' is opposed by the action of a lever $E^2$ which bears against the upper side of the diaphragm E′, and is fulcrumed at $E^3$, and is connected to a loading device shown as a tension spring $E^4$, the tension of which may be adjusted by means of a nut $E^5$. The free end of the lever $E^2$ is connected to the operating lever F′ of a rheostat F and sweeps over a series of contacts $F^2$ connected to sections of a resistance $F^3$. With the described arrangement, as the steam pressure rises and falls, the rheostat lever F′ is moved to increase and decrease, respectively, the amount of resistance in, and thereby to decrease, or increase, respectively, the current strength in an electric control circuit.

This electric control circuit, as shown, comprises a supply conductor 1 connected to the lever F′, the particular contact $F^2$ engaged by the lever F′, the corresponding portion of the resistance $F^3$, the conductor 3 connecting the resistance $F^3$ to one energizing terminal of a regulator GD, the conductor 4 connecting the second energizing terminal of the regulator GD to one energizing terminal of a regulator GC, a conductor 5 connecting the second energizing terminal of the regulator GC to one energizing terminal of a regulator GB, and a supply conductor 2 which is connected to a second energizing terminal of the regulator GB. The strength of the current flowing through the control circuit just described obviously depends upon the voltage between the supply conductors 1 and 2, which should be practically constant, and on the resistance in the circuit, which in any given condition of operation is constant, and is automatically controlled as previously described by the steam pressure through the gauge E. A manually adjustable resistance R permits of change in the ratio between steam pressure and the rate of combustion maintained by the regulating system.

In the control system illustrated in Fig. 1 the rate of combustion is primarily dependent on the adjustment of the stack damper D which is automatically adjusted by the regulator GD to increase and decrease the flow of heating gases through the boiler furnace as the electric control current increases and decreases in response to decreases and increases in the boiler steam pressure. The regulator GB tends to make the rate of fuel supply to the furnace proportional to the strength of the electric control current and hence to the rate of combustion, but this tendency is automatically modified as hereinafter explained by variations in the $CO_2$ content of the flue gases. The regulator GC constitutes a modified form of balanced draft regulator which operates to maintain a constant pressure in the furnace chamber above the grate so long as the electric control current is constant, and when the strength of this current increases and diminishes, the regulator GC operates to increase and decrease the minus pressure or degree of vacuum in the furnace chamber as the rate of combustion increases and diminishes. The regulators GB, GC and GD are all alike in principle in that each comprises means for balancing an electromagnetic force which is a function of the strength of the control current against some other force which is, or is a function of, the condition to be regulated by the particular regulator.

In the simple diagrammatically illustrated form of the regulator GC, the latter comprises a bell $G^5$ which dips into sealing liquid within the container $G^6$ and is subjected at its upper side to the pressure of the atmosphere and at its inner or under side to the pressure in the combustion chamber immediately above the grate transmitted to the interior of the bell by the conduit $G^7$. The bell $G^5$ is suspended from one end of the lever $G^3$ fulcrumed at $G^4$ and the downward pull of the bell $G^5$, due to the excess of the pressure of the atmosphere over the pressure in the furnace, is normally balanced by the action of an adjustable counterweight carried by the lever $G^3$ coupled with an electromagnetic pull which is a function of the electric control current and is produced by an electromagnet comprising an armature $G^2$ carried by the lever $G^3$, and the winding G′ in the electric control circuit. On an increase in the strength of the control current relative to the pressure differential acting on the bell $G^5$, whether such increase be due to an adjustment of the rheostat F in response to variations in steam pressure, or to a change in fuel bed resistance to gas flow therethrough, or results from both of these causes, the lever $G^3$ tilts to engage a contact 21. On a decrease in the strength of the control current relative to the pressure differential the lever $G^3$ tilts in the opposite direction and engages a contact 11. In a neutral intermediate position of the lever $G^3$ the latter does not engage either of the contacts 11 or 21.

When the lever $G^3$ is tilted to engage either of the contacts 11 or 21 it energizes a reversible control motor $C^6$ operating a rheostat $C^7$ to thereby increase or decrease the speed of the blower motor $C^5$ as required to restore the lever $G^3$ to its neutral position. The rheostat $C^7$ serves to increase or decrease the energizing current supplied to the motor $C^5$ from supply conductors 10 and 20. The supply conductors 10 and 20 associated with the device GC, as well as the conductors 10 and 20 associated with other regulating devices illustrated, can be connected to any suitable source, for example, they may be branches of the supply conductors 1 and 2. The motor $C^6$ as shown, has one terminal connected to the supply conductor 20, a second terminal connected to the contact 11, and a third terminal connected to the contact 21. The lever $G^3$ as diagrammatically illustrated, is connected to the supply conductor 10 through the branch conductor 12. When the lever $G^3$ engages the contact 21 one circuit including supply conductors 10 and 20, and branch conductors 12 and 22, and the conductor 14 of the reversible motor $C^6$ is energized, and the motor rotates in the direction required to so adjust the rheostat $C^7$ as to decrease the speed of the blower C. When, on the other hand, the lever $G^3$ engages the contact 11 it thereby energizes the second circuit of the motor $C^6$ which then rotates in the direction required to adjust the rheostat $C^7$ to increase the speed of the blower C.

The balance GD serves to open and close the stack damper D as required to maintain a constant ratio between an electromagnetic force which is a function of the strength of the control current and the pressure drop or draft loss in some portion of the furnace system in which the draft loss is approximately proportional to the weight rate of flow of the heating gases through the boiler, or, more accurately, to the square of that rate. As shown, the balance GD responds to the differential between the pressure at the inlet to the second, and the pressure at the outlet from the third of the passes for the heating gases across the water tubes, the pressure at these two points being transmitted to the balance GD by the pipes $G^{10}$ and $G^{11}$. When the pressure differential impressed on the balance GD through pipes $G^{10}$ and $G^{11}$ increases or decreases relative to the strength of the control current, the balance GD closes one or another of the control circuits for the reversible motor $D^5$ so that the latter is energized from the supply conductors 10 and 20 to close or open the damper D as required to restore the balance GD to its normal neutral condition.

The balance GB serves to maintain a predetermined relation between the strength of the control current flowing through the electromagnetic winding of the balance GB and the outlet pressure of a small blower $B^6$, that pressure being a definite function of the blower speed and hence of the rate of fuel supply, since the blower $B^6$ is driven by the stoker motor $B^5$. As the strength of the control current energizing the winding of the balance GB increases or decreases relative to the delivery pressure of the blower $B^6$, a reversible motor $B^7$ is set into operation in the one direction or the other to adjust a rheostat $B^8$ as required to thereby increase or decrease the speed of the stoker motor necessary to restore the balance GB to its normal neutral position.

I have not thought it necessary herein to illustrate the details of construction which may be employed in the balances GB and GD, because, as already explained, these balances are similar in principle to the balance GC, and these balances comprise nothing novel with me. On the contrary, these balances may be of the same construction as balances disclosed in my prior patents and applications, and in particular may be exactly similar in form to balances illustrated in my application Serial No. 121,547, filed September 22, 1916.

In accordance with the present invention, I employ a $CO_2$ machine H, which may be the well known Uhling instrument or other known form of instrument for creating a pressure in the pipe H′ of the instrument which varies in inverse proportion to the amount of $CO_2$ in the flue gas sample withdrawn from the last pass of the boiler through the conduit $H^2$. In the diagrammatic representation of my invention illustrated the pressure in the pipe H′ is transmitted to the metallic U-tube I to thereby raise and lower a metal float J which floats on the mercury or other conducting sealing liquid in the U-tube. As the float J rises and falls it cuts portions of a resistance J into and out of a circuit in shunt to the balance GB. This shunt circuit, as shown, comprises the portion of the resistance J′ between a branch 30 from the supply conductor 1, the float J and contact carried by the latter, the sealing liquid, the wall of the U-tube I, and a conductor 31 running from the latter to the conductor 5.

With the construction described, an increase in the steam pressure which corresponds in general to a decrease in the boiler load, brings about a throttling movement of the damper D, and a decrease in the rate of operation of the motors $B^5$ and $C^5$ and thereby in the rate at which fuel and air for its combustion are supplied to the furnace. A decrease in the steam pressure tends to produce an opening movement of the damper D and an increase in the rate at which the motors $B^5$ and $C^5$ supply fuel and air for its combustion to the furnace.

In accordance with the present invention, the rate at which fuel is supplied to the furnace is further modified by the action of the $CO_2$ machine H which tends to increase the stoker speed and thereby thicken the fuel bed on a decrease in the amount of $CO_2$ in the heating gases which results from a thinning of the fuel bed and consequent increase in the amount of excess air, and conversely on an increase in the amount of $CO_2$ in the furnace gases such as would result from a deficiency of excess air, the stoker is slowed down to allow the fuel bed to thin whereby the amount of excess air is increased and a more efficient combustion is obtained. The $CO_2$ machine H thus acts as an auxiliary controller to modify the stoker feed as required to compensate for variations between the actual rate of fuel feed and the rate of combustion and thereby maintain a fuel bed of average thickness. In addition the $CO_2$ machine H operates to thicken or thin the fuel bed when because of "holes", clinker formations or from other cause the fuel bed, while of normal thickness, passes too much or too little excess air from the maintenance of the proper $CO_2$ content in the stack gases.

Figure 2:
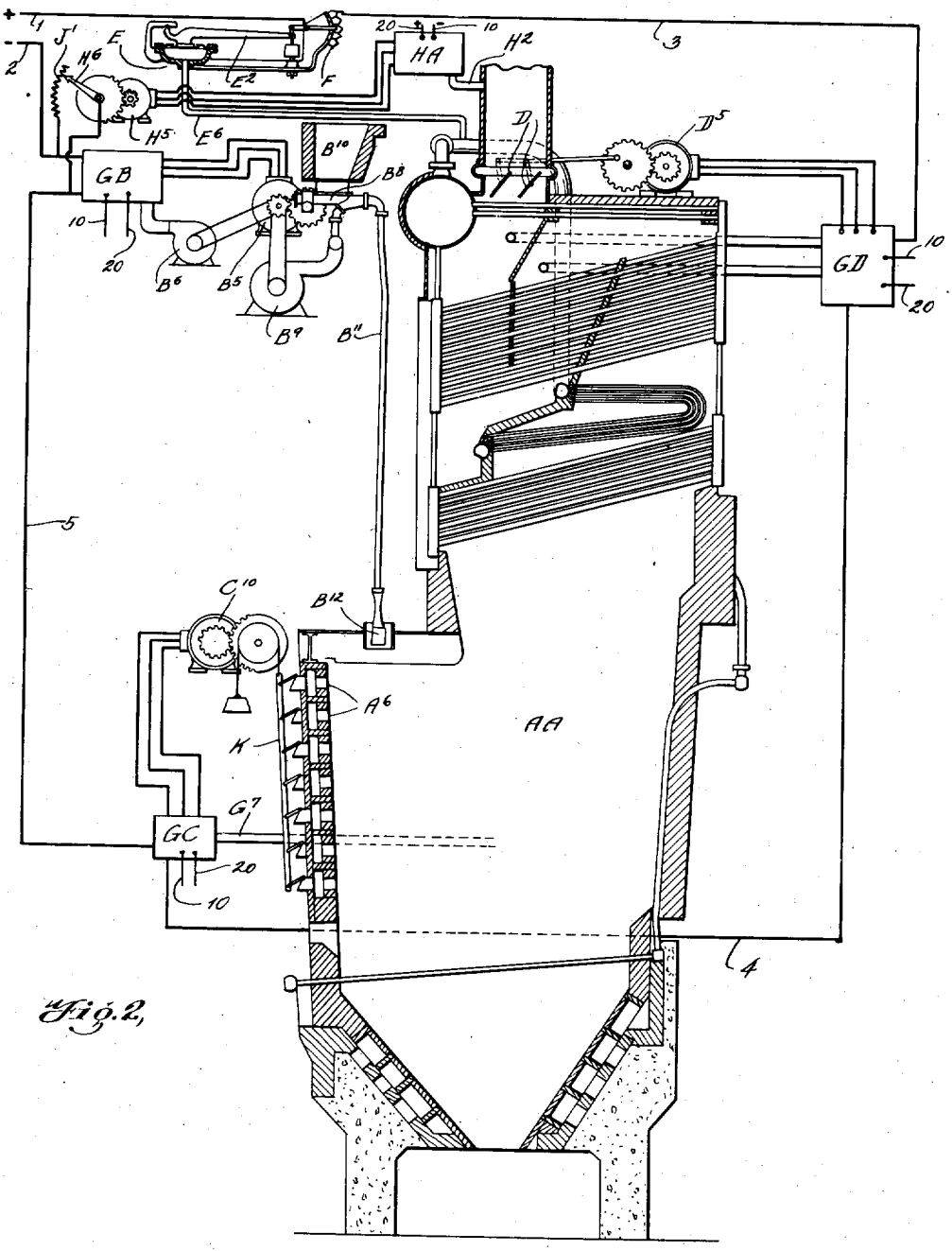
Fig. 2 is a diagrammatic sectional elevation of a powdered coal burning furnace.

In Fig. 2 I have illustrated the use of my invention in connection with powdered coal burning boiler furnace to the combustion chamber AA of which powdered coal is supplied by a feeding mechanism $B^8$ and a blower $B^9$ supplying carrier air, the feeder $B^8$ and blower $B^9$ being both driven from a motor $B^5$. Coal is supplied to the feeding mechanism through the chute $B^{10}$ and the mixture of powdered coal and carrier air is passed into the combustion chamber through one or more, and usually more, delivery pipes $B^{11}$ each connected to an individual burner nozzle $B^{12}$. In Fig. 2 the regulator GC of Fig. 1, is jointly responsive to the combustion chamber pressure transmitted into the regulator through the pipe $G^7$ and to the electric control current. The regulator GC is employed to adjust a damper mechanism K through a reversible motor $C^{10}$ and thereby increases or decreases the amount of secondary air supplied to the combustion chamber AA through the ports $A^6$ in the furnace wall, as the strength of the control current increases or diminishes. In Fig. 2 also an electric $CO_2$ machine HA is employed to control a reversible motor $H^5$ to adjust a contact $H^6$ and thereby increase or diminish the portion of the resistance J′ in shunt to the regulator GB as the $CO_2$ content in the stack gases diminishes below or increases above a predetermined value. Aside from the features mentioned, the general arrangement and operation of the apparatus shown in Fig. 2 is identical with that of Fig. 1.

In the operation of a powdered fuel burning furnace there are no fuel bed "holes" and clinker formations to give trouble as in grate fired furnaces, but the rate at which the powdered fuel is fed varies very markedly with variations in certain characteristics of the fuel and partly with variations in its moisture content, so that with a given speed of the motor $B^5$ there may be wide variations in the rate at which fuel is actually passed into the combustion chamber. This is compensated for by the operation of the $CO_2$ machine HA. It is to be noted that the $CO_2$ machine HA may be of one or another of various known forms of electrical $CO_2$ machines, and hence does not require specific explanation. It is also to be understood moreover, that in the apparatus of Fig. 2 the type of $CO_2$ machine shown in Fig. 1 might be employed, and that the electrical $CO_2$ machine of Fig. 2 might be employed in the apparatus of Fig. 1.

In the form of my invention illustrated in Fig.

3, the control provisions for adjusting the stack damper D and the speed of the blower C are identical with those illustrated in Fig. 1. Furthermore, the stoker mechanism and the controlling provisions therefor including the $CO_2$ machine H and the resistance shunt about the stoker regulator GB thereby controlled are shown of the same form as in Fig. 1. The control current to which the stoker speed regulator GB is subject in the arrangement of Fig. 3, however is a different control current from that employed to regulate the damper D and blower C and is not responsive to the pressure of the steam but to the rate at which the steam is withdrawn from the boiler. To this end I provide an electro-magnetic flow balance L energized from the supply conductors 10 and 20 and subjecting the regulator GB through the conductors 40 and 41 to an electric control current the strength of which is proportional to the square root of the difference between the static pressure and the total pressure in the steam pipe $A^5$. The static pressure is transmitted to the balance L by a pipe $L^2$, and the total pressure is transmitted to the balance by the pipe L′. It is not necessary to illustrate or describe the construction of the regulator L in detail as electric flow balances suitable for the purpose are fully disclosed in my prior patents and applications, including my above mentioned application, Serial No. 121,547.

Figure 3:
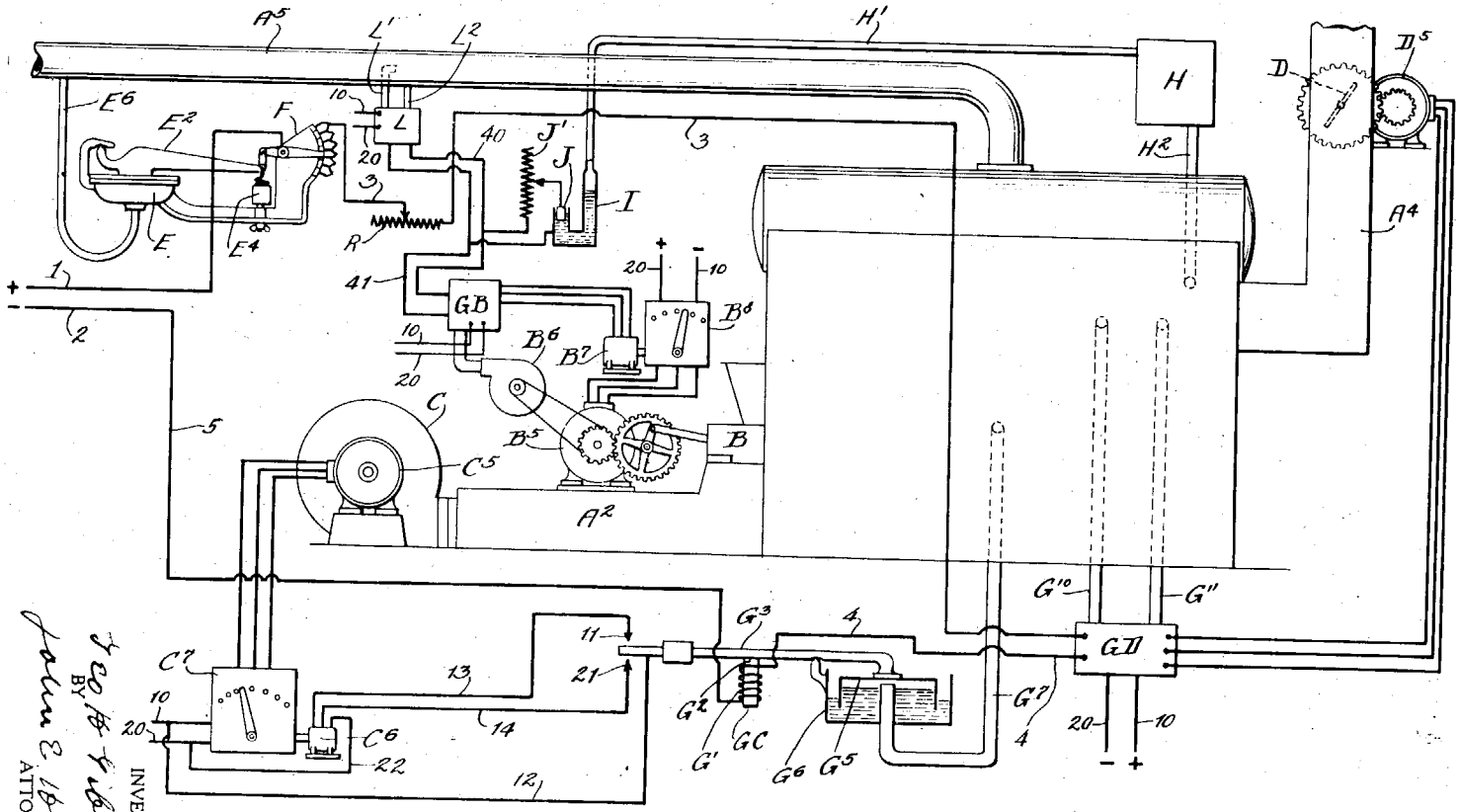
Fig. 3 is a view generally similar to Fig. 1 illustrating a modification of the apparatus shown in Fig. 1.

In the operation of the apparatus shown in Fig. 3 the rate of combustion, which depends primarily on the rate of air feed, is governed by the pressure of the steam, while the supply of fuel is primarily dependent on the rate at which steam is withdrawn from the boiler. This is desirable in stoker fired furnaces because on an increase in the demand for steam, the stokers immediately begin to thicken the fuel bed, whereas the supply of air does not begin to increase until later when the increased rate of steam withdrawal results in a reduction in the pressure of the steam. In consequence, the thickening of the fuel bed produced before the increase in the rate at which air is supplied begins, counteracts the tendency of the more energetic air feed through a fuel bed of given thickness to pass a larger percentage of excess air through the latter than is passed by a less energetic blast.

While in accordance with the provisions of the statutes I have illustrated and described the best form of the embodiment of my invention now known to me, it will be apparent to those skilled in the art that formal departures may be made in the apparatus and methods specifically illustrated and described without departing from the spirit of my invention as set forth in the appended claims and that certain features of my invention may sometimes be used with advantage without a corresponding use of other features.

Having now described my invention what I claim as new and desire to secure by Letters Patent is:

1. In a combustion regulating system for a boiler furnace comprising provisions tending to vary the supply of fuel and air for its combustion in accordance with the boiler load, said provisions including means for establishing a measure of the rate of fuel supply, regulating means responsive to variations in said measure, means for establishing a measure of the rate of air supply, and air supply regulating means responsive to variations in the last mentioned measure, the improvement which consists in means responsive to the $CO_2$ content in the products of combustion for varying the ratio of fuel supply to air supply to minimize variations in said content.

2. In a combustion regulating system for a boiler furnace, the combination with automatic fuel supply control provisions tending to make the rate of fuel supply proportional to the boiler load, said provisions including means for establishing a measure of the rate of fuel supply and fuel supply regulating means responsive to variations in said measure, of means automatically responsive to the $CO_2$ content in the products of combustion for increasing and decreasing the rate of fuel supply as said content decreases below and rises above a predetermined value.

3. In a combustion regulating system for a boiler furnace, the combination of means for creating an electric control current which is a function of the boiler load, a fuel feed regulator energized by said current and a $CO_2$ machine modifying the action of the control current on the regulator in response to variations in the $CO_2$ content of the products of combustion formed in the furnace.

4. In a combustion regulating system for a boiler furnace, the combination with means for varying the rate of supply of air for combustion in inverse response to variations in the boiler steam pressure, of means tending to make the rate of fuel supply proportional to the rate at which steam is withdrawn from the boiler.

5. In a combustion regulating system for a boiler furnace, the combination with means for varying the rate of supply of air for combustion in inverse response to variations in the boiler steam pressure, of means tending to make the rate of fuel supply proportional to the rate at which steam is withdrawn from the boiler, and means responsive to the $CO_2$ content in the products of combustion formed for modifying the rate of fuel supply in inverse response to variations in said content from a predetermined value.

6. In a combustion regulating system for a boiler furnace, comprising provisions tending to vary the supply of fuel and air for its combustion in accordance with the boiler load, said provisions including means for establishing a measure of the rate of fuel supply, regulating means responsive to variations in said measure, means for establishing a measure of the rate of air supply, and air supply regulating means responsive to variations in the last mentioned measure, the improvement which consists in means responsive to the composition of the products of combustion for varying the ratio of fuel supply to air supply to minimize variations in said composition.

7. In a combustion regulating system for a boiler furnace, the combination with automatic fuel supply control provisions tending to make the rate of fuel supply proportional to the boiler load, said provisions including means for establishing a measure of the rate of fuel supply and fuel supply regulating means responsive to variations in said measure, of means automatically responsive to the composition of the products of combustion for increasing and decreasing the rate of fuel supply as said composition varies in one way or another from a predetermined composition.

8. In a combustion regulating system for a boiler furnace with a fuel feeder, comprising provisions tending to vary the supply of fuel and air for its combustion in accordance with the boiler load, said provisions including means for establishing a measure of the rate of speed of the fuel feeder or of the draft flow and means for regulating said rate in response to variations in said measure; the improvement which consists in means responsive to the composition of the products of combustion for varying the ratio of fuel supply to air supply to minimize variations in said composition.

9. In a combustion regulating system for a boiler furnace, the combination with automatic fuel supply control provisions tending to make the rate of fuel supply proportional to the boiler load, and automatic air control provision tending to make the rate of air supply proportional to the boiler load and including means for establishing a measure of the last mentioned rate and means regulating the air supply in response to variations in said measure, of means automatically responsive to the composition of the products of combustion for increasing and decreasing the rate of fuel supply as said composition varies in one way or another from a predetermined composition.

GEORGE H. GIBSON.